Dec. 9, 1958 E. W. GOLDBERG 2,863,356
SHIFTABLE FILM BED AND OPTICAL SYSTEM FOR PROJECTORS
Filed Aug. 30, 1951 7 Sheets-Sheet 1

INVENTOR.
Ernest W. Goldberg
BY

Dec. 9, 1958       E. W. GOLDBERG       2,863,356
SHIFTABLE FILM BED AND OPTICAL SYSTEM FOR PROJECTORS
Filed Aug. 30, 1951       7 Sheets-Sheet 2
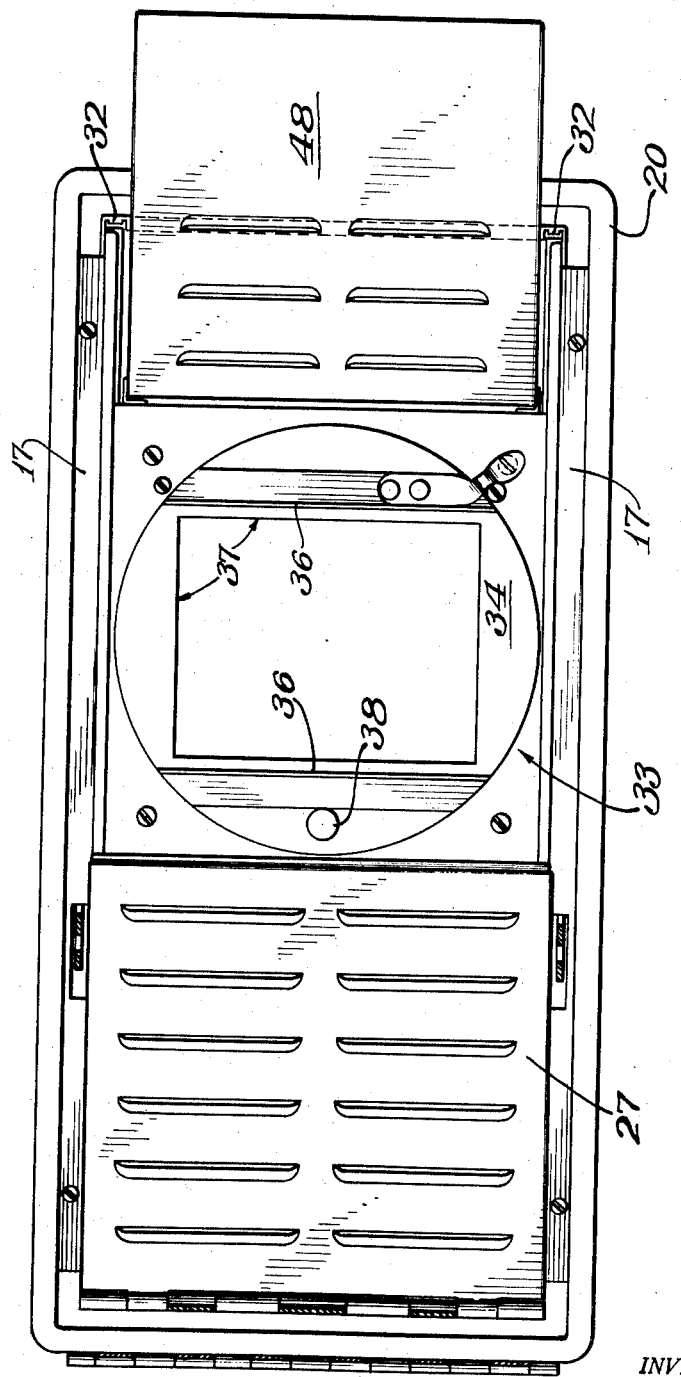
INVENTOR.
Ernest W. Goldberg
BY Dec. 9, 1958 E. W. GOLDBERG 2,863,356
SHIFTABLE FILM BED AND OPTICAL SYSTEM FOR PROJECTORS
Filed Aug. 30, 1951 7 Sheets-Sheet 3
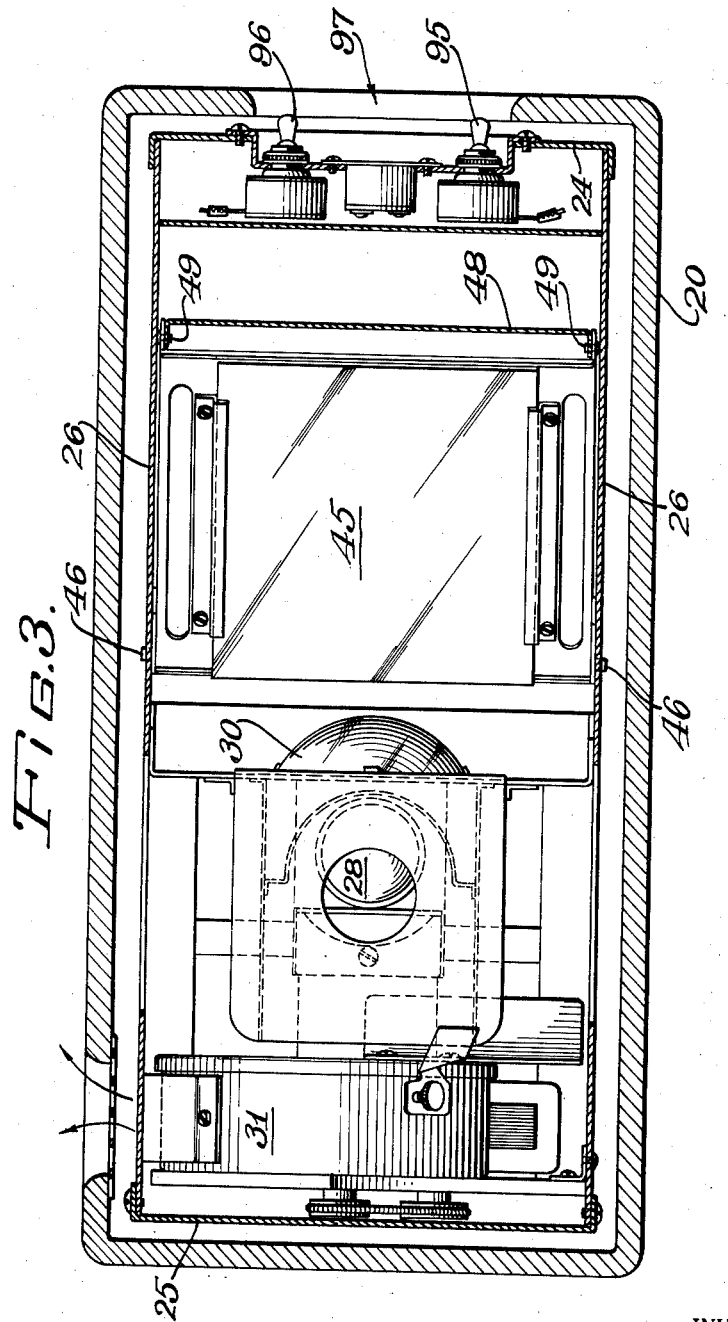
INVENTOR.
Ernest W. Goldberg
BY

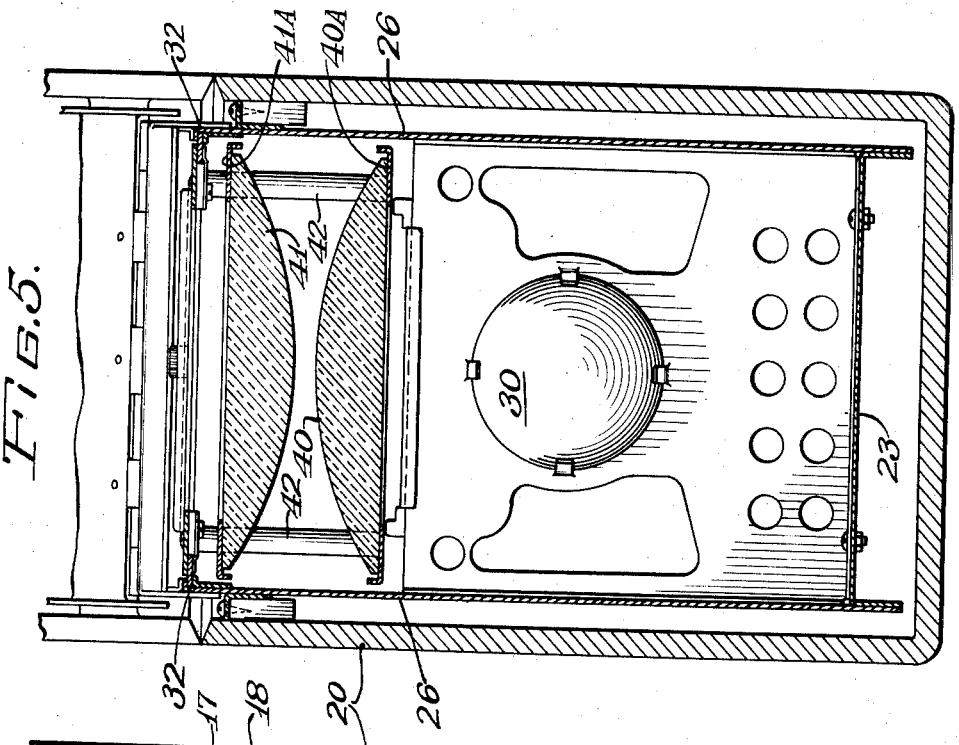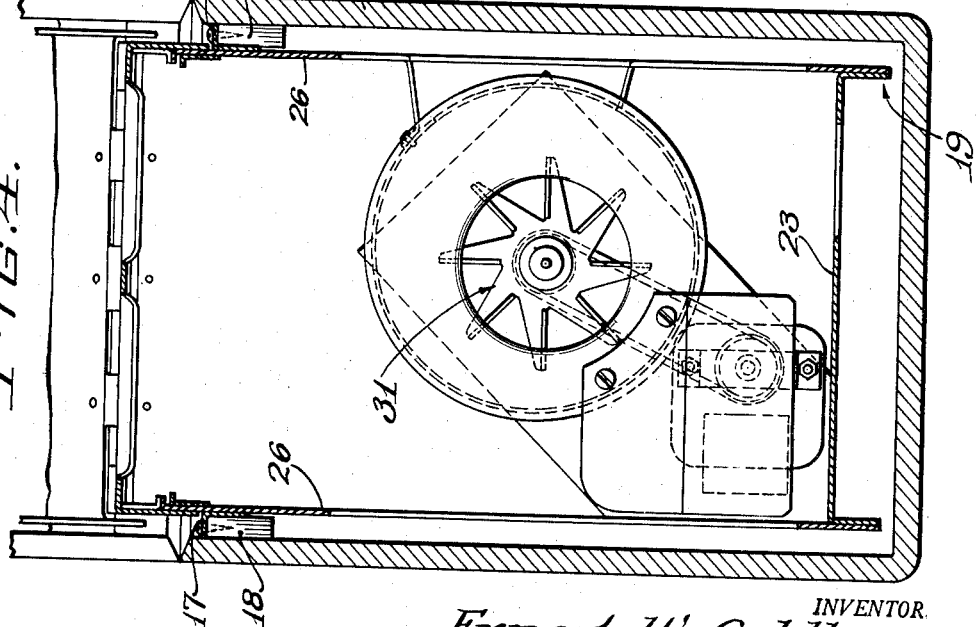

Dec. 9, 1958 E. W. GOLDBERG 2,863,356
SHIFTABLE FILM BED AND OPTICAL SYSTEM FOR PROJECTORS
Filed Aug. 30, 1951 7 Sheets-Sheet 5
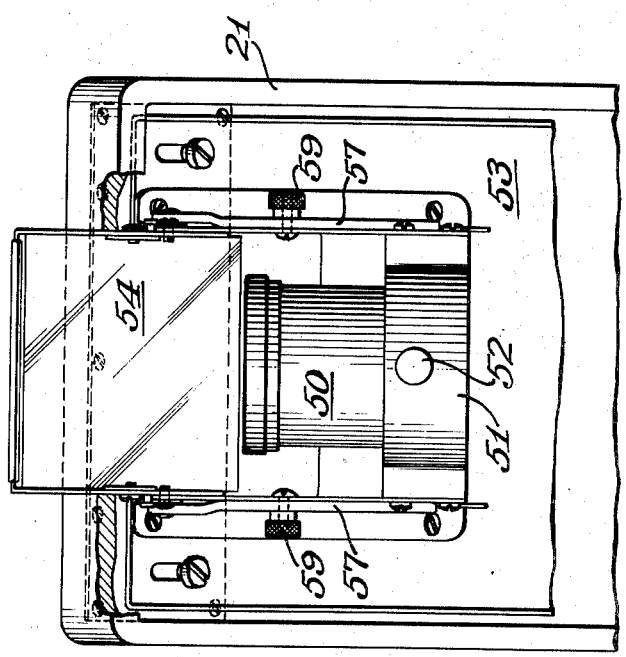
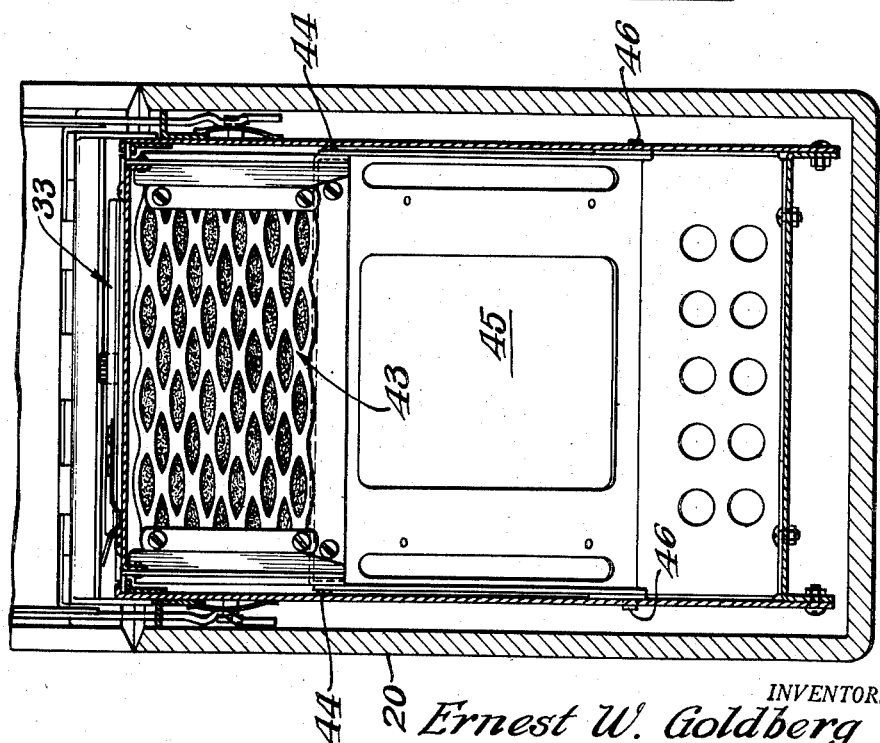
INVENTOR.
Ernest W. Goldberg
BY

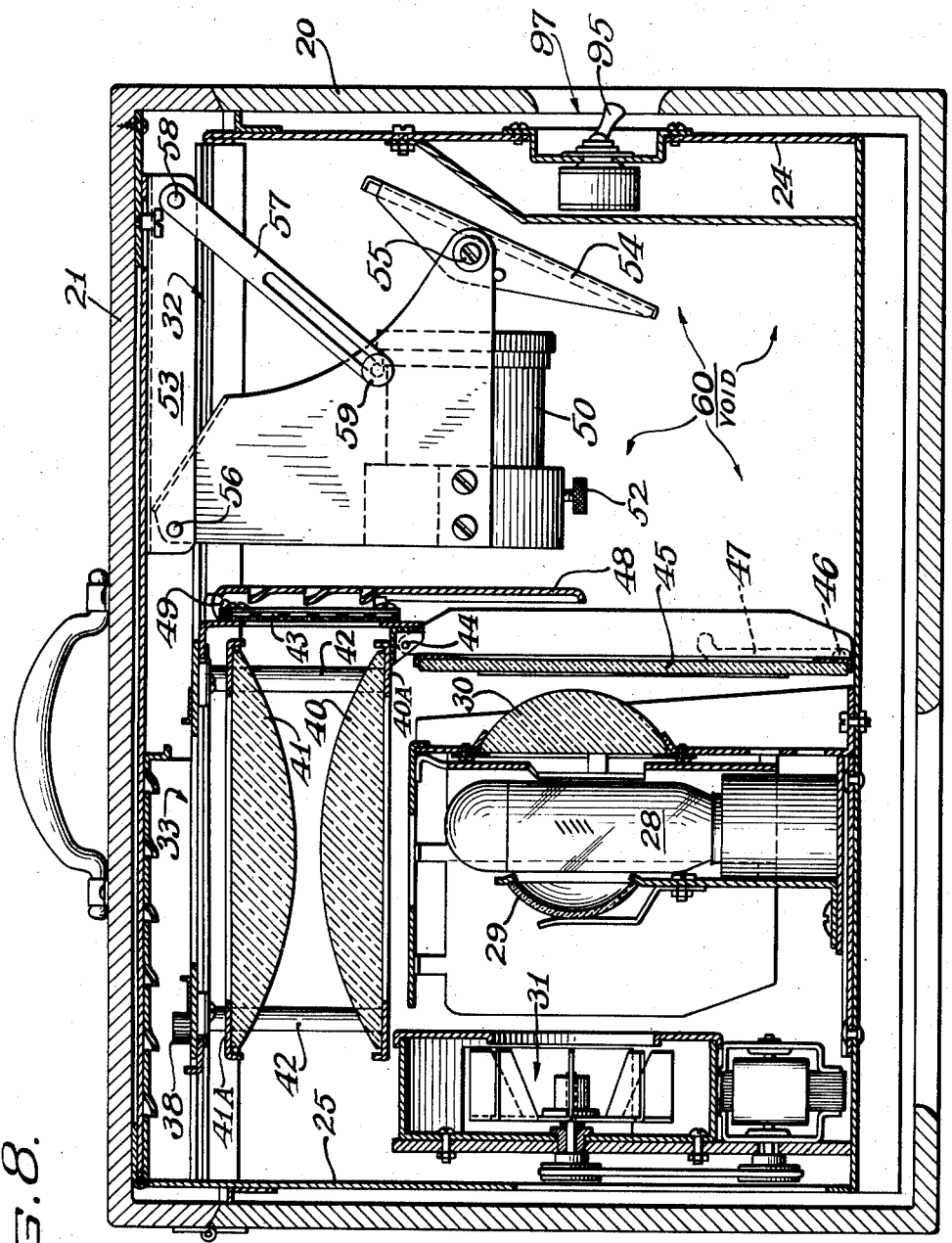

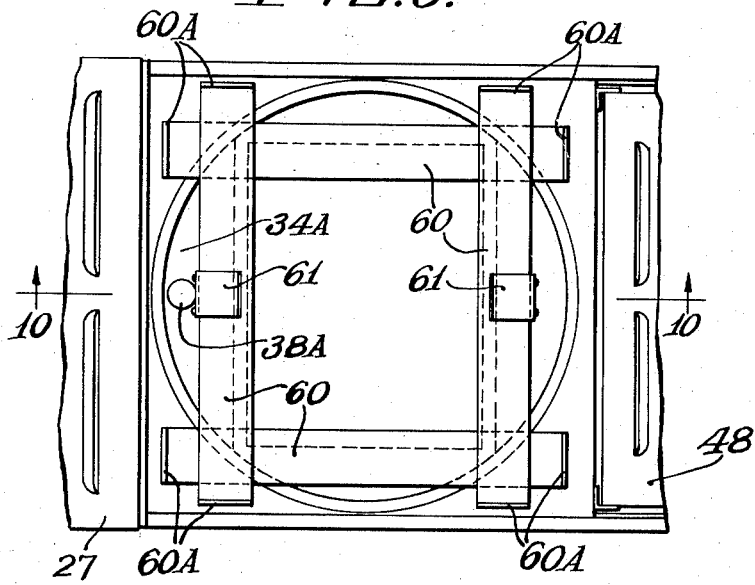
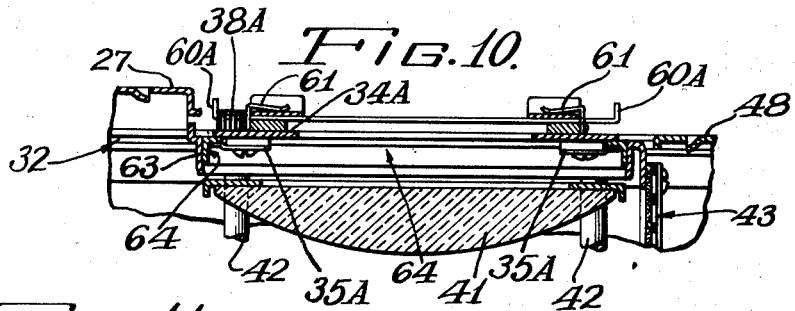
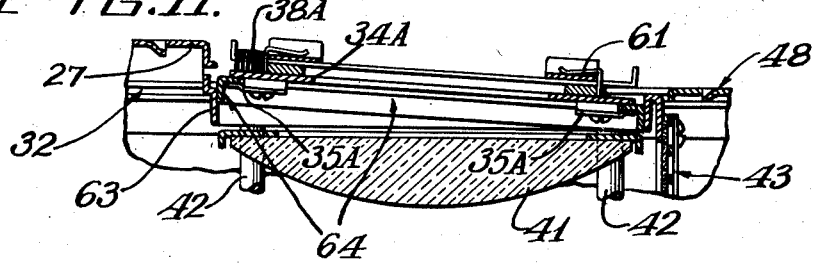

United States Patent Office 2,863,356
Patented Dec. 9, 1958

2,863,356

SHIFTABLE FILM BED AND OPTICAL SYSTEM FOR PROJECTORS

Ernest W. Goldberg, Wilmette, Ill.

Application August 30, 1951, Serial No. 244,290

11 Claims. (Cl. 88—24)

This invention pertains to picture or slide-projection apparatus, and more particularly to so-called overhead projectors.

Projectors of the type named are characterized, among other things, in that they are commonly portable and include parts, such as mirrors, lenses, and the like, adapted to fold into and out of operative position relative to some form of carrying case.

The present invention has as its principal object the provision of improvements in overhead and similar projectors of coacting, shiftable mirror and condensing lens means linked for joint movement into and out of operative position to accommodate other projection instrumentalities, especially, but not exclusively, in conjunction with a carrying case or the like.

Other and more detailed objects relate to the provision, in a device of the type hereinabove characterized, of a horizontally sliding projection bed and table, which includes a slide or transparency holder, condensing lenses carried therebelow, a redirecting light mirror also carried by the table beneath the lenses, and means for automatically moving the mirror into and out of operative relation to a light source and the condensing lenses, as a function of sliding the bed or table back and forth.

Another object is the provision of a supporting structure for the projection apparatus and adapted to fit into a portable casing in such manner as to create a void to receive a projection lens which folds down with a top or cover for the casing, whereby to utilize available space most efficiently, and to facilitate operation of this type of projector.

It is a further object to provide a supporting structure for a projector consisting of an upstanding metal frame having a pair of horizontal flanges along its upper sides, and a carrying case into which said frame fits, with said flanges resting on interior ledges in the case so as to hold the projector frame in suspension therein.

Additional objects and aspects of novelty and utility pertain to details of the construction and operation of the embodiment described in view of the annexed drawings, in which:

Fig. 2 is a top plan view of the projection bed and table taken at the meeting plane of the main casing and cover;

Fig. 3 is a horizontal section taken along lines 3—3 of Fig. 1;

Fig. 4 is a vertical section taken along lines 4—4 of Fig. 1;

Fig. 5 is another vertical section taken along lines 5—5 of Fig. 1;

Fig. 6 is a vertical section looking in the direction of lines 6—6 of Fig. 1;

Fig. 7 is a fragmentary elevational detail of the case cover with parts shown in section and showing the projecting lens and mirror in elevation and in operative position;

Fig. 8 is a vertical section similar to Fig. 1 but showing the parts folded into non-operative or stowed condition with the carrying case closed;

Fig. 9 is a top plan view of a modified framing means for the projection bed;

Fig. 10 is a vertical sectional detail of the modified form of movable slide or transparency holder in the bed as seen along lines 10—10 of Fig. 9; and Fig. 11 is a detail like that of Fig. 10 showing the modified slide or transparency holder or bed rocked into an adjusted position.

Figure 1:
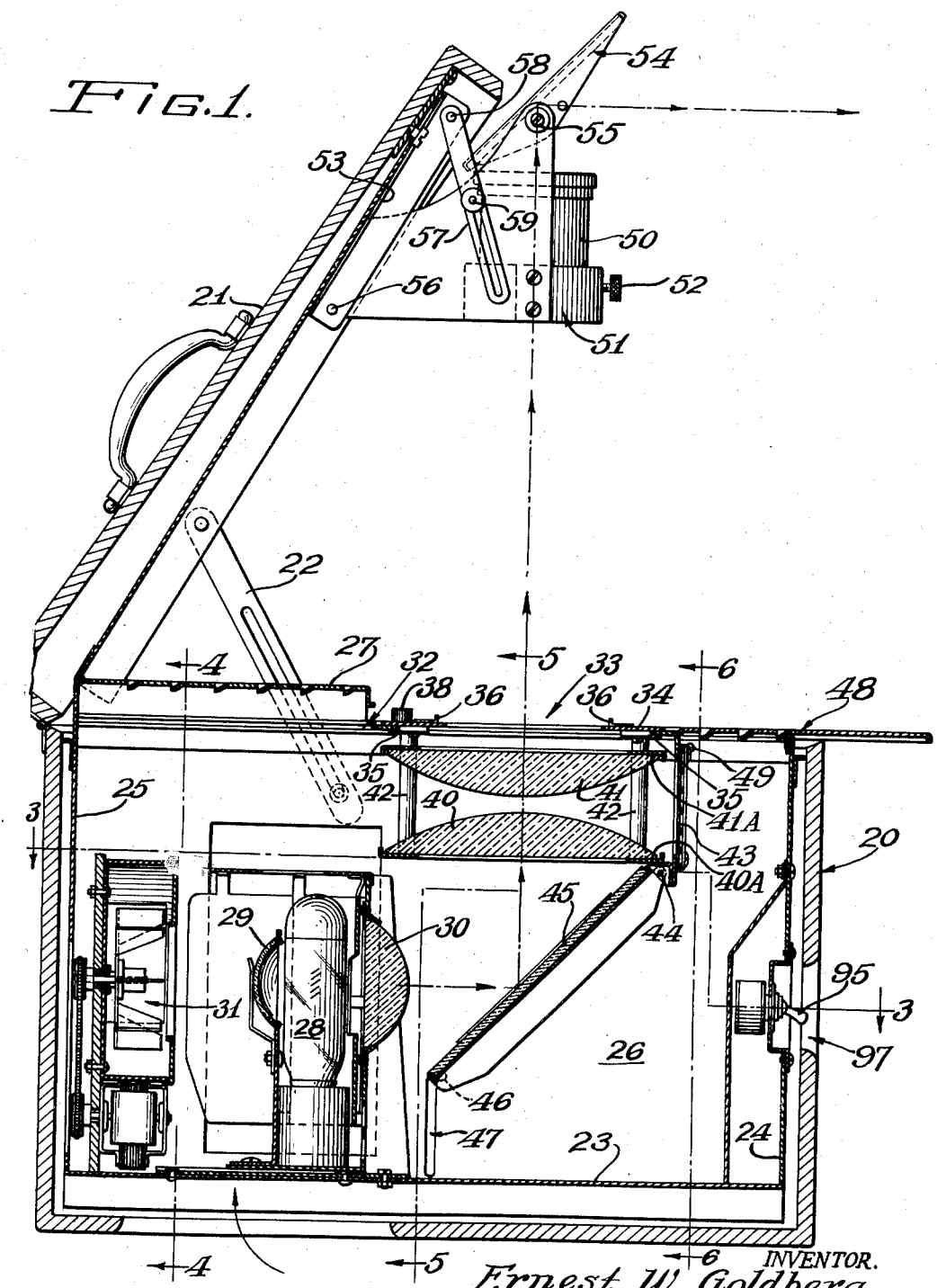
Fig. 1 is a vertical sectional detail of an overhead projector showing the novel construction in operative condition.

Referring to Fig. 1, the overhead projector there shown in section includes a carrying case having a main or bottom section 20 and a hinged lid or cover 21 adapted to be maintained in an open angular position by releasable braces 22.

The projector itself includes a sheet metal framework with a bottom 23, front wall 24, rear wall 25, and side walls 26. The top of the metal framework includes a hinged lamp-house cover 27, beneath which is a conventional lamp unit having a lamp 28, reflector 29, and lens 30. Behind the lamp unit is a motor-driven blower 31.

Slidable horizontally in tracks 32 is a projection bed consisting of a slide or transparency holder generally indicated at 33 (see also Fig. 2), and comprising a circular frame 34 rotatably secured to the bed as by underneath clips 35, and having opposite film or slide guide flanges 36 on its upper face.

As viewed in Fig. 2, the circular bed plate is provided with a square opening or window indicated at 37. Knob 38 is used to rotate the bed to position the picture as desired.

Mounted beneath the slide bed as a part thereof (Fig. 1) are a pair of condensing lenses 40 and 41, held in carrier plates 40A, 41A, spaced by rods 42 attached to the bed. On the forward side of the condensing lenses is a filter unit 43 to filter dust from these lenses (see also Fig. 6).

Pivotally attached, as at 44, to the underside of the condensing lens unit is a redirecting mirror 45 having pin means 46 at its lower margin and working in guide slots 47 in the frame parts. (See Figs. 3 and 6, also.)

A table plate 48 is hingedly attached as at 49 to the lens and filter structure for movement from the horizontal working position, shown in Fig. 1, to the pendant, folded or stowing condition shown in Fig. 8.

A projecting lens unit 50 (Figs. 1 and 7) slidable in a carrying frame 51 and held by set screw 52, is pivotally secured to the inside of the top or lid 21 on a base plate 53; and this unit also includes a second redirecting or overhead mirror 54 pivoted as at 55 on the carrier frame 51 into optical alignment with the projection lens for direction of the image-forming rays onto the usual screen (not shown).

The projection lens and mirror frame or carrier 51 is pivoted as at 56 on the base plate so that this unit can be rocked from the operative position of Fig. 1 to the folded or stowing condition shown in Fig. 8, slotted bracket arms 57 pivoted at 58 on the base plate, and on lock screws 59, being used to hold the lens unit in adjusted operating positions.

A feature of the supporting and casing structure resides in the provision (Fig. 2) of a pair of horizontal side flanges 17 integral with the sidewalls 26 along the upper opposite margins thereof, said flanges resting on ledge bars 18 (Fig. 4) attached to the inside upper margins of the main or lower case section 20, such that the frame means 23, 24, 25, 26, and the projector appendages carried thereby, are suspended interiorly of the case, to be spaced from the sides of the case, and the bottom (as at 19, Fig. 4) to afford liberal tolerance for easy fitting and additional air spacing, together with easy insertion and removal of the unit.

Operation

Assuming that the projector is in its closed and stowed condition of portability, as shown in Fig. 8, and is to be readied for use, the lid 21 is raised to the position of Fig. 1 and thus held by braces 22.

At this time, the slidable film bed and condensing lens unit 33, 40—41 is in the condition of Fig. 8, i. e. slid to the left to overlie the lamp unit 28—29—30; and the work table 48 is folded down into pendant position, from which it will be apparent that a void, indicated at 60 in Fig. 8, is created in the front part of the projector structure (and hence effectively in the container or case).

The void 60 is utilitarian in that it accommodates, as in Fig. 8, other projector parts, such as the overhead projection lens unit 50—51—54 for stowing purposes, and in addition affords extra space for spare lamps and the usual extension electric cord (not illustrated).

By grasping the bottom edge of the pendant work table, after opening the lid, the table 48 may be raised to its operative horizontal position, and the table and slide bed (including lenses 40, 41) slid forward to the condition shown in Fig. 1.

Automatically, as a function of moving the slide bed and work table to operative condition, as aforesaid, the first redirecting mirror 45 is pivoted to operative position by the action of pins 46 in slots 47 (Fig. 1).

The operator then adjusts the projection lens 50 and second or overhead mirror 54 for proper focus and angle. Manipulation of blower motor switch 95 and lamp switch 96 (Fig. 3), accessible through an opening 97 in the front wall of the case, will start the blower 31 and energize lamp 28.

Thereupon, desired transparencies, slides, or films may be placed in the bed means 33 and the latter adjusted, as by manipulation of knob 38, to orient the image as desired, light from source or lamp 28 being directed by the first mirror 45 into the condensing lenses 40, 41, thence through the film or transparency in the bed and upwardly through the projection lens 50 for redirection by the overhead mirror 54 to a desired screen.

A modified form of slide bed is shown in Figs. 9 to 11 wherein the circular plate 34A is rotatably seated in the frame plate by cleats 35A, to be turned by manipulation of knob 38A in orienting the projected image.

Commonly, projectors of this type must be set at an angle to the screen, and this results in a form of image distortion frequently referred to as keystoning by reason of the fact that the projected picture, instead of appearing perfectly rectangular on the screen, will be wider at one vertical side than at the other, giving rise to a trapezoidal shape somewhat like a conventional keystone laid on its side.

To correct for such effects to a considerable degree there is provided a distortion framing means in the film bed, consisting of four thin metal strips 60 arranged in quadrilateral array, two opposite strips being slidably and movably held down by spring clips 61 (Figs. 9 and 10), which exert sufficient pressure so that the remaining pair of framing strips are held down by the first-mentioned opposite pair.

Each strip 60 has its ends 60A upset to afford manipulation of the handles, so that the framing strips can be turned and arranged to frame out keystone and like effects on the screen.

In addition to the aforementioned rotary motion of the slide holder 34, the plate 34A of the modified holder has a second degree of motion—namely, a rocking motion, which is afforded by reason of the fact that the main bed plate includes a member 63 (Figs. 10 and 11) having an internal concaved curvature of spherical contour constituting a socket in which a rocking plate 64 of complementary convex or external spherical contour seats in the manner of a ball and socket structure, carrying with the rotatable circular plate 34A and the framing means 60, etc.

In other respects the modified shiftable and adjustable slide or film bed structure is like that shown in Figs. 1 and 8, in that it also includes as a part thereof the folding work table 48, the condensing lens means 40—40, etc., all slidable as a unit in tracks 32, cooperably with the mirror means 45, 46, 47 (not shown in Figs. 9 to 11) as heretofore described.

It should be observed, as in Fig. 8, that the condensing lens system 40—41 is movable to overlie the light source unit in a highly compacted condition; and likewise the first or light mirror 45 is automatically folded very compactly up against this same light source unit, so that this part of the apparatus occupies a minimum of space in stowed condition, thereby affording the void or utility space 60 in a volume almost equal to that occupied by the aforesaid compacted parts.

I claim:

1. In a picture projection apparatus, in combination, a housing having a top opening, a cover for said opening, a horizontally extensive trackway close to said top opening, a film bed slidable in said trackway from a stowed position near the back region of the housing to a projecting position near to the front thereof, a light source in the housing underlying said trackway near said back region and underlying said bed when the latter is moved to said stowed position, projection lens means on said cover and disposed in optical alignment with said bed when the cover is in a predetermined open position and said bed is moved into said projecting position, and light-reflecting means pivotally attached to said bed to move therewith and having a relatively stationary pivoting connection by means of which said reflecting means is pivoted into optical alignment with said light source and said bed responsive to movement of the latter into projecting position, and by means of which said reflecting means is pivoted into stowed position closely adjacent said light source when said bed overlies the latter, whereby to create a void in said housing underlying said projecting lens means such that the latter will fit into said void when said cover is closed upon the housing.

2. In picture projection apparatus, a casing having an open top, a hinged cover for said top, a slide bed mounted to slide back and forth in parallelism with the opening of said top for movement from a stowed position near the rear of the casing to a projecting position near the front thereof, projecting lens means on the underside of said top and disposed in projecting position and in optical alignment with said bed when the top is in a predetermined open position and said bed is moved into said projecting position, a light source in said casing near the rear thereof to underlie said bed when the latter is in said stowed position, a light-directing mirror pivotally attached to said bed, and means having connection with said mirror to effect pivotal movement thereof responsive to movement of the bed from stowed to projecting position and vice-versa whereby said mirror is pivoted into optical alignment with said light source, said bed and said projecting lens means, when both the latter are in said projecting positions, and said mirror is pivoted in a stowed condition closely adjacent said light source when the bed is moved into stowed position, thereby creating a void in said casing in the region thereof underlying said projecting lens means to accommodate the latter when said top is closed upon the casing.

3. In an overhead projector of the type including a casing having an open top with a hinged cover, overhead projecting lens means carried on the underside of said cover and a light source in said casing near one end thereof remote from said projecting lens means, improvements comprising, to wit: a film bed mounted to move back and forth across the open top of the casing from a stowed position overlying said light source to a projecting position underlying said projecting lens means and in optical alignment therewith, condensing lens means carried beneath said bed to move therewith to direct light through the bed to said projecting lens means, a light-directing mirror linked for movement with said bed and to pivot relative thereto, and means connected with said mirror for effecting pivotal movement thereof responsive to back and forth movement of said bed, said mirror being pivoted into optical alignment with said light source and said bed and projecting lens means as a function of movement of the bed into said projecting position, and being further pivoted into a stowed condition toward and close to said light source as a function of movement of the bed into stowed position, whereby to create a void in said casing in the region underlying said projecting lens means for accommodation of the latter in said void when said cover is closed upon the casing, and a work table pivotally attached to said bed for movement from a stowed pendant position in the region of said void to a horizontally raised position in the approximate plane of said bed, said table being maintained in said raised position by part of said casing when the bed is moved into projecting position as aforesaid, and being pivotable downward into stowed position stowed in close parallelism with said mirror when the latter and the bed are in stowed position as aforesaid.

4. In an overhead projector of the class including an open-topped casing and a hinged top thereon with projecting lens means carried by the top and disposed in projecting position when the top is opened to a certain position, improvements comprising, to wit: a light source situated in the casing near one end thereof to leave a void near an opposite end thereof beneath said projecting lens means, and a horizontally extensive film bed slidable across the opening of said top from a stowed position overlying said light source to a projecting position underlying said projecting lens means and in optical alignment therewith, and light redirecting means pivotally attached to the underside of said bed and having a pivoting connection with means in said casing to pivot the redirecting means into and out of operative position and optical alignment with said light source and said bed as a function of movement of the bed into and out of stowed and projecting position as aforesaid, said redirecting means occupying part of said void when in operative position as aforesaid, and being pivoted substantially out of said void when in stowed position as a result of movement of the bed to stowed position, whereby said void is automatically cleared for reception of said projecting lens means.

5. In picture projection apparatus including an overhead projection lens, means defining a horizontally extensive trackway beneath said projecting lens, a film bed slidable in said trackway into and out of optical alignment with said projecting lens, condensing lens means carried by said bed in optical alignment therewith, a light-directing mirror pivoted on said bed for movement into and out of optical alignment with said condensing lens means, means affording a relatively stationary connection with said mirror for effecting pivotal movement thereof responsive to sliding movement of said bed, and a light source positioned near one end of said trackway and below the same and out of alignment with said projecting lens, such that said bed is slidable from a stowed position to overlie the light source with said mirror pivoted compactly close to the light source, to a projecting position beyond the light source and beneath said projecting lens with said mirror pivoted into optical alignment with both the light source and the condensing and projection lens means.

6. In light projection apparatus, in combination, a light source, means defining a horizontal trackway extending from a region overlying said light source to a projecting position horizontally therebeyond, a carrier slidable in said trackway, lens means movable with said carrier, light-directing means pivotally mounted on said carrier, and relatively stationary means having pivotal connection with said directing means to cause pivotal movement of the latter responsive to sliding movement of said carrier, said directing means being pivoted as aforesaid into optical alignment with said lens means and said light source as a function of sliding movement of the carrier to dispose the lens means in said projection position.

7. In a light projection apparatus, the combination, with projecting lamp means, of means defining a guideway extending above said lamp means, a lens unit movable in said guideway from a postion overlying the lamp means to a projecting position therebeyond, a mirror pivotally attached to said lens unit for movement into and out of optical alignment therewith and with said lamp means, and means having connection with said mirror to effect pivotal movement thereof responsive to movement of said lens unit in said guideway, whereby to pivot the mirror away from said lamp means into optical light-projecting alignment with said lamp means and said lens unit when the latter is moved into said projecting position, and to pivot said mirror closely adjacent said lamp means when the lens means substantially overlies the lamp means.

8. In an overhead picture projector including a light source and a projecting lens disposed at one horizontally offset side and above the light source, a movable condensing lens and film bed means comprising: a carrier member mounted to slide horizontally from a position overlying said light source to a projecting position underlying said projecting lens, means on said carrier member for holding a transparency in projecting position relative to said projecting lens, condensing lens means carried by said carrier member beneath said holding means, a mirror mounted to move with said carrier member and to pivot relative the means including a relatively stationary part having pin-and-slot connection with said mirror to effect pivotal movement of the latter responsive to sliding movement of said carrier member, the latter and said mirror being arranged and constructed to dispose said mirror operatively in an angular position away from said light source in optical alignment with the latter, said condensing lens means and said projecting lens, responsive to movement of the carrier member into projecting position as aforesaid, and to pivot said mirror into an inoperative position which is relatively upright and closely adjacent said light source responsive to movement of the carrier member into position overlying the light source.

9. In an overhead projector of the class described, in combination, a horizontally slidable transparency bed, a first lens means beneath said bed and movable therewith for directing light through a transparency therein, a projection lamp near one terminus and beneath the plane of sliding movement of the bed, a second lens means situated near the other terminus and above said plane of movement, and a light-directing device requiring angular adjustment relative to the lamp and said first lens means to direct light from the lamp through the first lens means when the latter is moved into optical alignment with the second lens means, said directing device being movable with said bed and pivotable relative thereto, and means providing connection with said directing device and effecting pivotal movement thereof responsive to sliding movement of the bed for pivoting the directing device into an angular position of optical alignment with the lamp and said first lens means responsive to movement of the bed into projecting position and alignment with the second lens means.

10. In an overhead projector, a casing, having an open top, a cover hinged to close said top, releasable brace means to latch said cover in angularly open projecting relation to said top, a projector unit fitted into said casing and having its top disposed approximately at the casing top, a lamp chamber and lamp means therein at one end of said unit adjacent the back of said casing, said chamber having an open top and a transverse side opening into said casing, a cover for the lamp chamber and including a transverse clearance opening therebeneath, a film bed supported for back and forth movement on said unit close to said open casing top, film and transparency positioning means on said bed, condensing lens means carried beneath the bed for movement therewith and in optical alignment with said transparency positioning means, said bed and lens means being slidable back and forth from an outwardly withdrawing projecting position to a retracted position back in said lamp chamber beneath said clearance opening so that in said retracted position a substantial part of said bed lies beneath the chamber top and the bed, and said condensing lens means substantially overlies said lamp means; projecting lens means carried on the underside of said cover to overlie said bed in optical alignment with the same and said condensing lens means in the withdrawn projecting position of the latter; and a pivoted plano mirror movable with said bed therebeneath, together with means cooperable with said mirror for pivoting the same from a retracted position of maximum proximity to said lamp means when the bed overlies the latter, to a withdrawn angular operating position relative to said lamp beneath said bed and condensing lens means, and in optical relation therewith, whereby to direct light through the bed to said projecting lens means, the latter, when said casing cover is closed, fitting down into a space in said projecting unit left vacant by said bed, condensing lens means and mirror when in retracted position as aforesaid.

11. In a portable, overhead-type projector, the combination with an open-topped case having a hinged lid and means for maintaining the lid in a predetermined open condition for projection purposes, of the following improvements, to wit: a light source in the case near one side thereof, said case being dimensioned to afford a substantial void between said source and an opposite side of the case; projection-lens means carried on the inner side of said lid and adapted to receive light directed upwardly from the interior of said case and redirect such light outwardly toward a screen; means for directing light from said source crosswise of the case toward said void; carrier means mounted to travel across the open top region of said case from a first position compactly close to said light source, to a second position at least partly occupying said void and underlying said projection-lens means; means movable with said carrier means and disposed thereby when the carrier is in said second position for redirecting light from said source upwardly from the case into said projection lens means; means movable with said carrier means for positioning a transparency in the path of said upwardly-directed light, said projection-lens means being situated on the lid as aforesaid in a position to descend into, and at least partly occupy said void when the lid is closed, said carrier means being movable into said first position to vacate said void to permit entry thereinto of the projection lens means as aforesaid.

References Cited in the file of this patent

UNITED STATES PATENTS

| | | |
|---|---|---|
| 1,319,820 | Williams | Oct. 28, 1919 |
| 1,545,674 | McKay | July 14, 1925 |
| 1,765,453 | Schmidling | June 24, 1930 |
| 1,857,135 | Brenkert et al. | May 10, 1932 |
| 1,919,922 | Baker et al. | July 25, 1933 |
| 2,052,298 | Ives | Aug. 25, 1936 |
| 2,330,799 | Coker et al. | Oct. 5, 1943 |
| 2,417,446 | Reynolds | Mar. 18, 1947 |
| 2,496,647 | Woodbury | Feb. 7, 1950 |
| 2,529,664 | Roysher | Nov. 14, 1950 |
| 2,564,057 | Fitzgerald | Aug. 14, 1951 |